United States Patent
Wu et al.

(10) Patent No.: US 7,676,149 B2
(45) Date of Patent: Mar. 9, 2010

(54) SYSTEM FOR BACKLIGHT DETECTION USING BRIGHTNESS VALUES OF SUBAREAS IN FOCUS AREA AND METHOD THEREFOR

(75) Inventors: Chung-Ta Wu, Taichung (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 415 days.

(21) Appl. No.: 11/732,247

(22) Filed: Apr. 3, 2007

(65) Prior Publication Data
US 2008/0159728 A1 Jul. 3, 2008

(30) Foreign Application Priority Data
Dec. 29, 2006 (TW) .............. 95150077 A

(51) Int. Cl.
*G03B 7/08* (2006.01)
(52) U.S. Cl. ........................... 396/234; 348/234
(58) Field of Classification Search ........ 396/121, 396/234; 348/223.1, 234
See application file for complete search history.

(56) References Cited

U.S. PATENT DOCUMENTS

| | | | | |
|---|---|---|---|---|
| 4,929,824 A | * | 5/1990 | Miyazaki | ............ 382/274 |
| 5,414,487 A | * | 5/1995 | Iwasaki | ............ 396/234 |
| 2007/0036531 A1 | * | 2/2007 | Tokunaga | ............ 396/69 |

* cited by examiner

*Primary Examiner*—Melissa J Koval
*Assistant Examiner*—Autumn Parker
(74) *Attorney, Agent, or Firm*—Morris, Manning & Martin LLP; Tim Tingkang Xia

(57) ABSTRACT

A system for backlight detection using the brightness values of the subareas in a focus area and method therefor are provided, which are applicable to an image capture device. The focus area is divided into a plurality of subareas and the brightness values of each of the subareas are calculated. Then, the brightness values of each of the subareas are converted into 0 and 1 codes, and then the codes are combined to generate the codes representing the entire focus area. The status values corresponding to each of the codes are determined with reference to a backlight detection table established in advance, so as to determine whether an object to be shot is in a backlight condition.

10 Claims, 5 Drawing Sheets

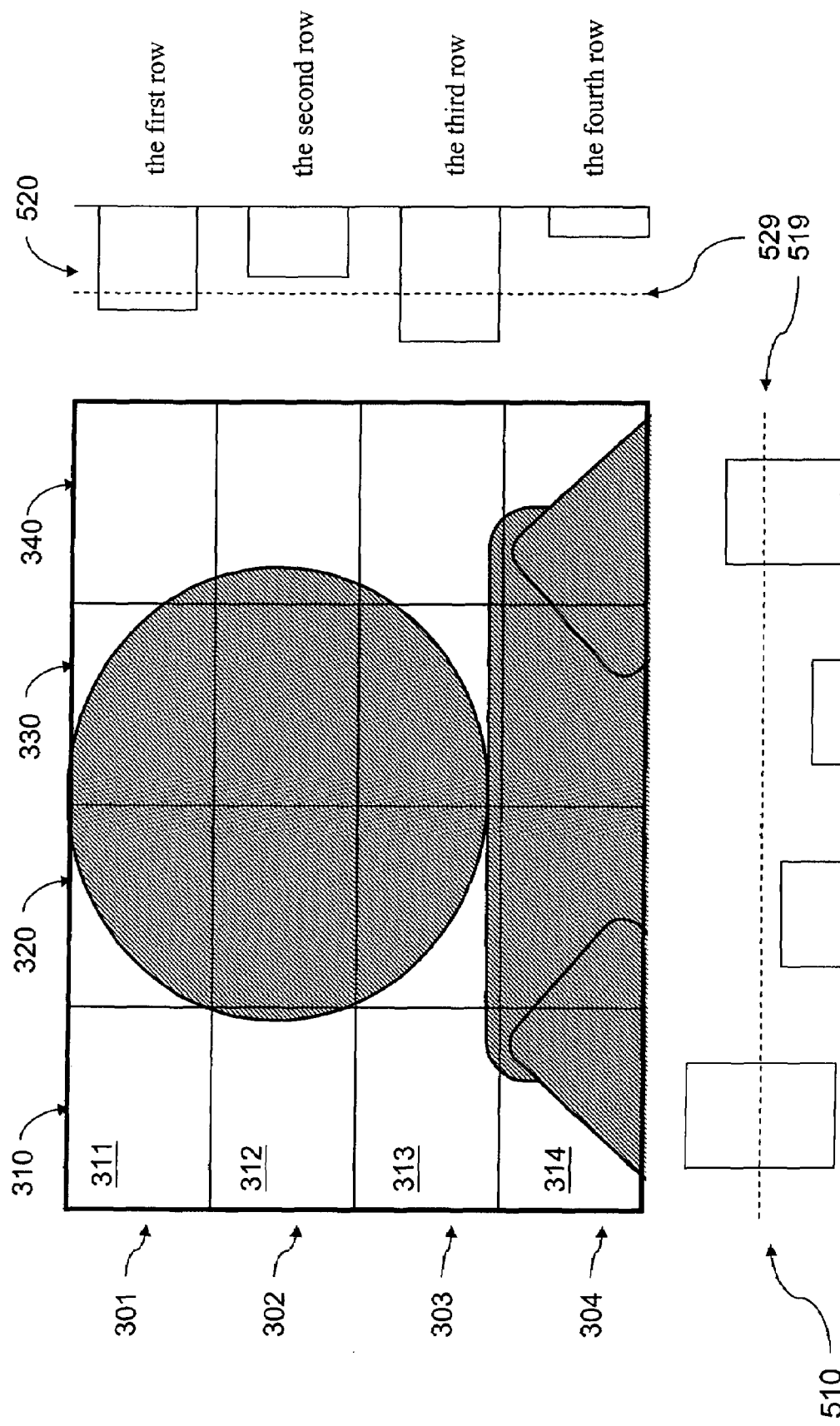

SYSTEM FOR BACKLIGHT DETECTION USING BRIGHTNESS VALUES OF SUBAREAS IN FOCUS AREA AND METHOD THEREFOR

CROSS-REFERENCE TO RELATED APPLICATIONS

This non-provisional application claims priority under 35 U.S.C. § 119(a) on Patent Application No(s). 095150077 filed in Taiwan, R.O.C. on Dec. 29, 2006, the entire contents of which are hereby incorporated by reference.

BACKGROUND OF THE INVENTION

1. Field of Invention

The present invention relates to a system for backlight detection and a method therefor, and more particularly to a system and a method for backlight detection using the brightness values of the subareas in a focus area.

2. Related Art

When an object to be shot is placed between a light source and a camera, a circumstance that a background brightness is much higher than the object to be shot occurs, which is called backlight. The background usually occupies the area larger than the object in an image. Therefore, in the backlight, if the auto-exposure function of the camera is selected, the camera exposes the image according to the light condition of the background, which results in an insufficient exposure of the object to be shot and further causes the shooting failure. In order to avoid the shooting failure when using the auto exposure function, generally the objects are shot while avoiding the backlight. However, there are some methods to avoid the shooting failure in the backlight condition. For example, if the object to be shot is not far away from the camera, a flash light can be turned on to enhance the brightness of the object.

With the progress of science and technology, at present, a technology has been developed to automatically detect whether an object to be shot is in the backlight condition. The common methods usually divide an image into a plurality of areas. For example, the whole image is uniformly divided or divided with a specific shape (for example, the center is a circle and the rest is divided into several parts). After division, different parts are further allocated with different weights. Subsequently, whether the object is backlight condition is determined based on a combination of the information of the parts and other data, such as the overall brightness value of the image (the backlight may occur when the overall brightness value exceeds a specific value) and the scene contrast (the larger the brightness contrast of the object and the background is, the more possible the backlight is).

According to the prior arts, usually, after a focus area is cut from the whole image, information about the contrast and brightness etc. between the focus area and the whole image is calculated. However, in actual environment, it is quite possible that the focus area contains a background with high brightness and an object with low brightness, such that the calculated contrast between the focus area and the whole image cannot reflect the real backlight condition correctly and the success ratio of the determination is thus reduced. In addition, the method of always cutting the focus area is not suitable for all scenes, for example, when the object to be shot slightly offsets or is placed at the border of the darkness and brightness, the determination may be incorrect.

SUMMARY OF THE INVENTION

In view of the problem that the method of cutting a focus area from the whole image easily causes false backlight determination, the present invention is directed to providing a method for backlight detection using the brightness values of the subareas in a focus area. The focus area is divided into a plurality of subareas. After the brightness values of each of the subareas are calculated, a code group is generated from the brightness values of each of the subareas to determine whether an object to be shot is in the backlight condition, thereby solving the problem of false determination existing in the prior art and then achieving the purpose and effect of enhancing the accuracy of the backlight determination.

In order to achieve the aforementioned object and effect, the present invention can achieve the above through a system and a method. The system provided by the present invention includes a focus area set module, a focus area dividing module, a brightness calculation module, an encoding module, a memory module, and a backlight determination module.

The method provided by the present invention includes focusing an object and setting a focus area; dividing the focus area into a plurality of subareas; calculating the brightness value corresponding to each of the subareas; generating a code group according to each of the brightness values; and according to the generated codes, reading corresponding status values from a backlight detection table. When the read status value means backlight, it is determined that the object is in backlight condition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein:

FIG. 4 is a bar chart of the sum of the brightness values of the focus area and each of the rows and the columns according to an embodiment of the present invention;

DETAILED DESCRIPTION OF THE INVENTION

Figure 1:
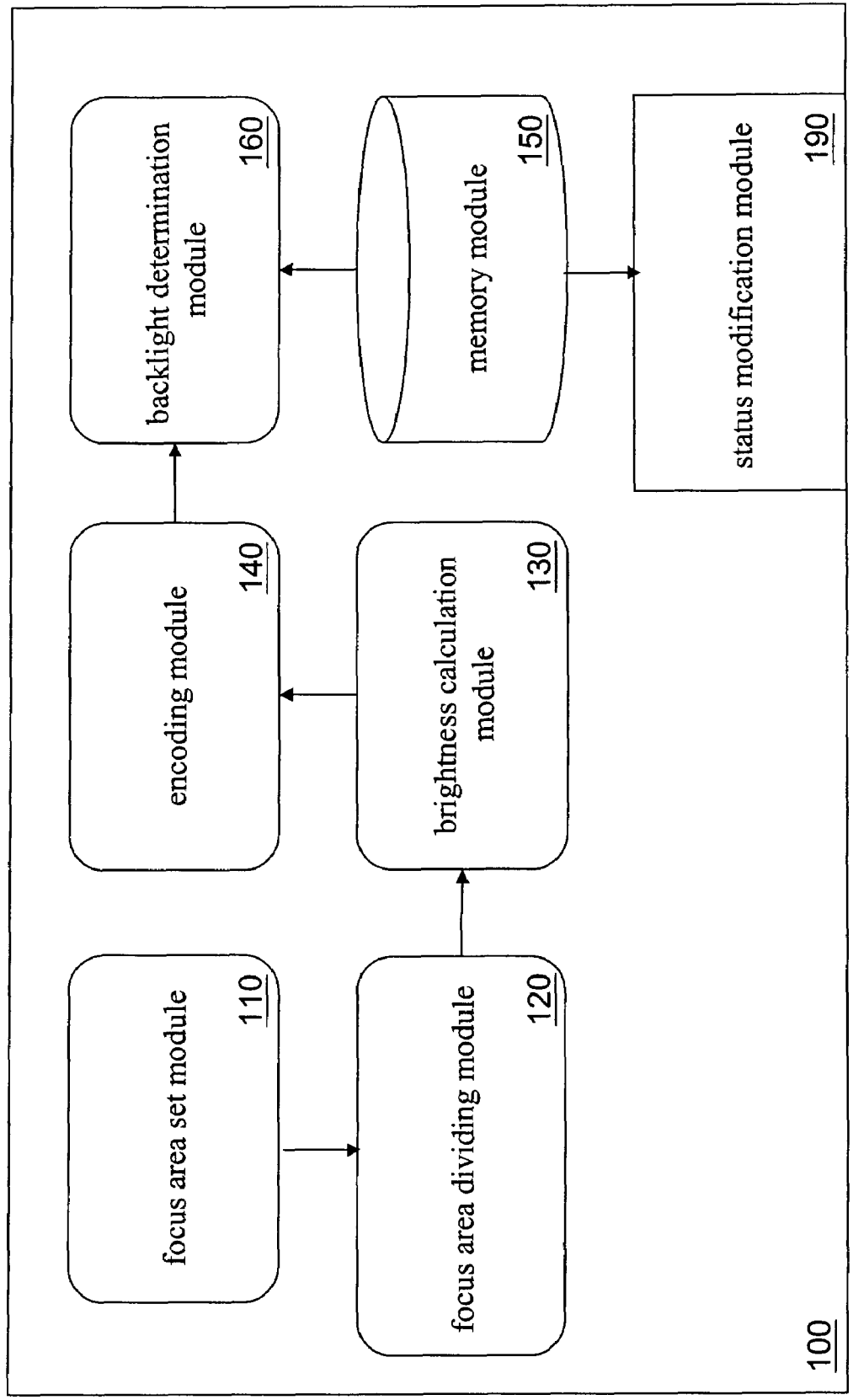
FIG. 1 is an architectural view of the system for backlight detection using the brightness values of the subareas in a focus area according to the present invention.

Referring to FIG. 1, an architecture view of the system of the backlight detection using the brightness values of the subareas in a focus area according to the present invention is shown for illustrating of the operation of the system of the present invention. As shown in the figure, the system of the present invention includes a focus area set module 110, a focus area dividing module 120, a brightness calculation module 130, an encoding module 140, a memory module 150, and a backlight determination module 160. The focus area set module 110 is responsible for setting a focus area when an image capture device 100 of the present invention is focusing an object to be shot. The focus area dividing module 120 is responsible for dividing the focus area set by the focus area set module 110 into a plurality of subareas. The brightness calculation module 130 is responsible for calculating each of the brightness values corresponding to each of the subareas generated after the focus area dividing module 120 divides the focus area. The encoding module 140 is responsible for converting each of the brightness values of each of the subareas calculated by the brightness calculation module 130 according to a special rule into a code group. The memory module 150 is responsible for storing the backlight detection table. The backlight determination module 160 is responsible for reading a corresponding status value from the backlight detection table stored in the memory module 150 according to the codes generated by the encoding module 140. When the read status value means backlight, the backlight determination module 160 determines that the object to be shot is in backlight condition.

Figure 2:
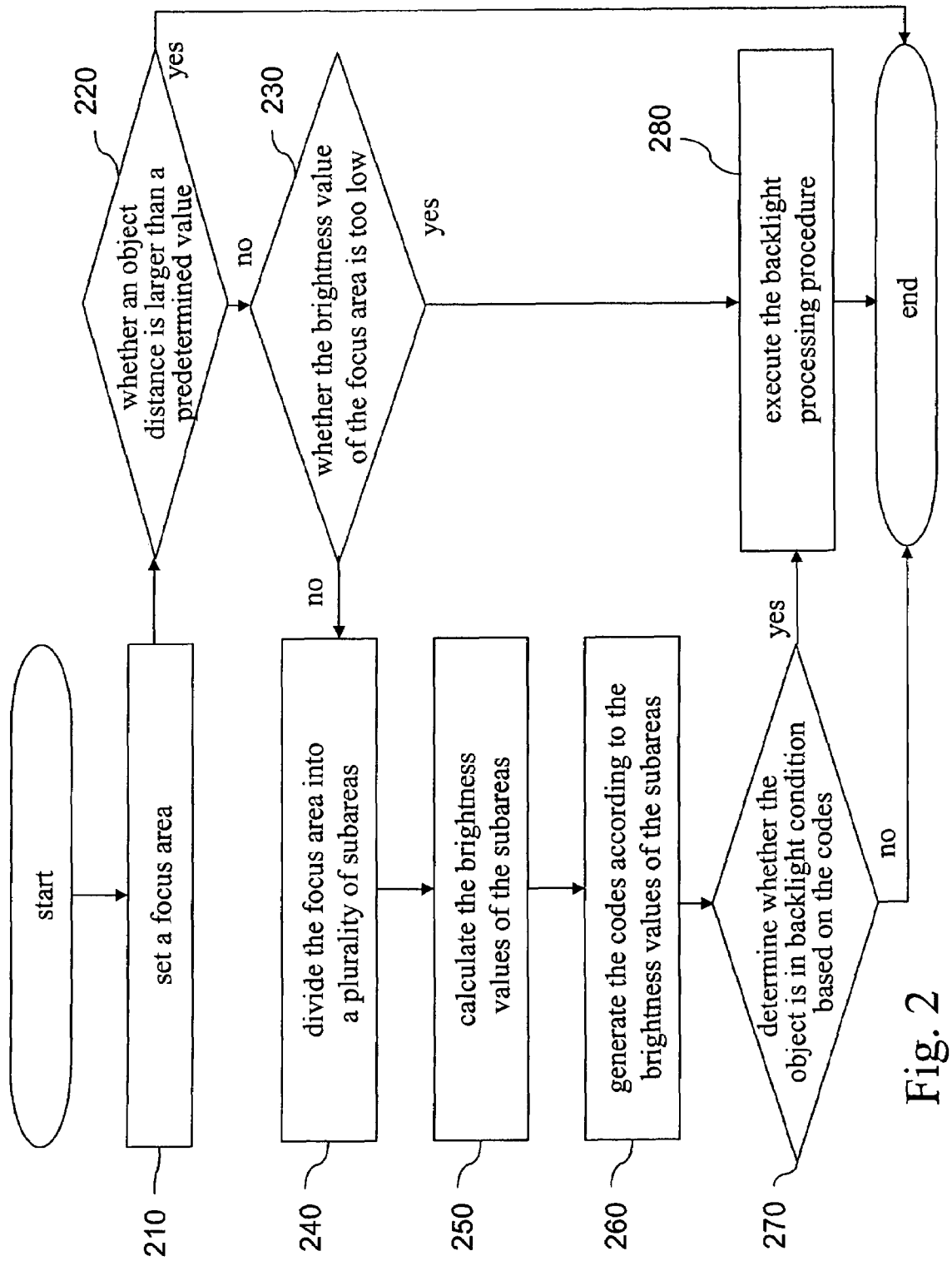
FIG. 2 is a flow chart of the method for backlight detection using the brightness values of the subareas in the focus area according to the present invention.
Figure 3:
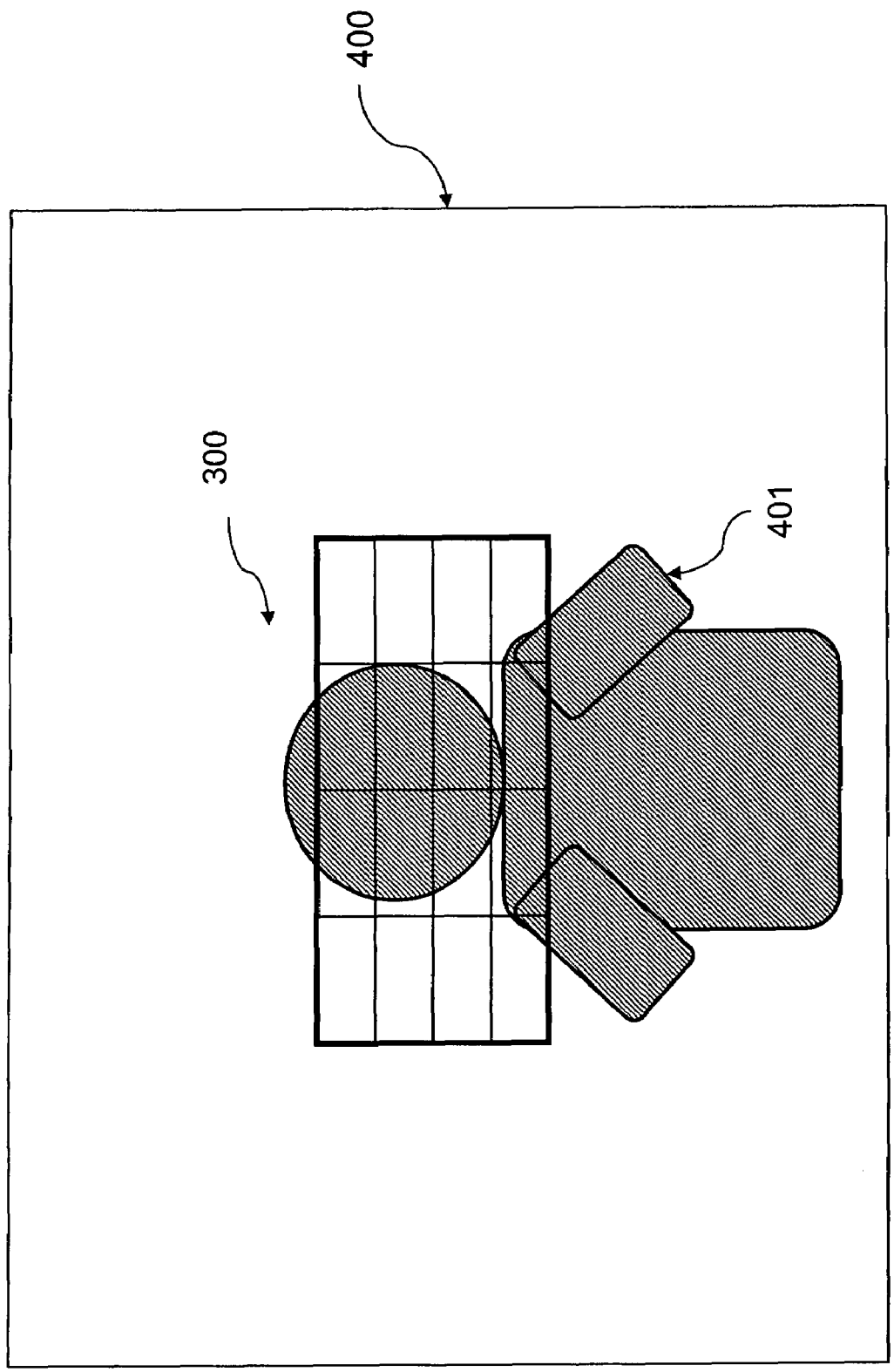
FIG. 3 is a shooting frame according to an embodiment of the present invention.

Next, the operation system and the method provided by the present invention are explained by referring to FIGS. 3 and 4 as an embodiment. The process flow of the operation of the method can refer to FIG. 2, which is a process flow chart of the method for backlight detection using the brightness values of the subareas in the focus area according to the present invention. In this embodiment, the image capture device 100 is, for example, a camera, but the image capture device 100 in the present invention is not limited to be a camera. Furthermore, for example, the object 401 to be shot by the camera is a person, but the object in the present invention is not limited to be a person.

When a user uses a camera 100 of the present invention to shoot a person 401, the focus area set module 110 of the present invention sets a focus area 300 in a shooting frame 400 when the user is focusing the person 401 to be shot by the camera 100 (Step 210). When the focusing is completed, the focus area dividing module 120 of the present invention divides the focus area 300 into a plurality of subareas (Step 240). In this embodiment, the focus area 300 is divided into, but not limited to, a 4×4 form, as shown in FIG. 3. According to the present invention, under the precondition that the backlight condition may be determined accurately, the focus area may be divided into various numbers of subareas.

After the focus area dividing module 120 divides the focus area 300 into a plurality of subareas (Step 240), in the present invention, the brightness values of each of the subareas are calculated respectively (Step 250). As shown in FIG. 3, a part of the image of the person appears in the focus area 300. Therefore, the brightness values of each of the subareas calculated in the present invention are different. The calculating manner is described in brief below. Firstly, one of the subareas is further divided into a plurality of smaller areas, and the values Y in YCbCr of each of the divided areas are obtained, and the average value $Y_{avg}$ is calculated based on all the values Y of the divided areas. Therefore, the brightness value is $\log 2 (Y_{avg})$.

After the brightness values of each of the subareas are calculated (Step 250), the encoding module 140 of the present invention generates a group of codes according to the brightness values of each of the subareas (Step 260). For example, in the form formed by the focus area 300, the encoding is performed according to the sum of the brightness values of the subareas in each of the columns and rows. That is, as shown in FIG. 4, the brightness values of the first subarea 311, the second subarea 312, the third subarea 313, and the fourth subarea 314 are added to obtain the sum of the brightness values of the first column 310. In a similar way, the sum of the brightness values of the second column 320, the third column 330, and the fourth column 340 are obtained. Then, the sum of the brightness values of each of the columns is compared with a critical value. When the sum of brightness values of each of the columns is larger than the critical value, the column corresponding to the sum of the brightness values larger than the critical value is converted into 1. As shown in the first bar chart 510 in FIG. 4, the sums of the brightness values in the first column 310, the second column 320, the third column 330, and the fourth column 340 are shown. The first critical value is a dashed line shown in the first bar chart 510, and from the first bar chart 510, it can be seen that the sums of the brightness values in the first column 310 and the fourth column 340 are larger than the first critical value, so the encoding module 140 encodes the first column 310 and the fourth column 340 as 1, and encodes the second column 320 and the third column 330 as 0. In a similar way, from the second bar chart 520, it can be known that the sum of the brightness values in the first row 301 and the third row 303 is larger than the second critical value 529, so the encoding module 140 encodes the first row 301 and the third row 303 as 1, and encodes the second row 302 and the fourth row 304 as 0. After each of the columns and each of the rows are all encoded, the encoding module 140 arranges each of the columns and the rows in a specific sequence, for example, the sequence of the first column 310 to the fourth column 340. The sequence of the first row 301 to the fourth row 304 generates a code group 10011010. The encoded result in the present invention is not limited to 1 or 0. In practice, the first critical value 519 and the second critical value 529 are the same numeral.

Figures 5A, 5B:
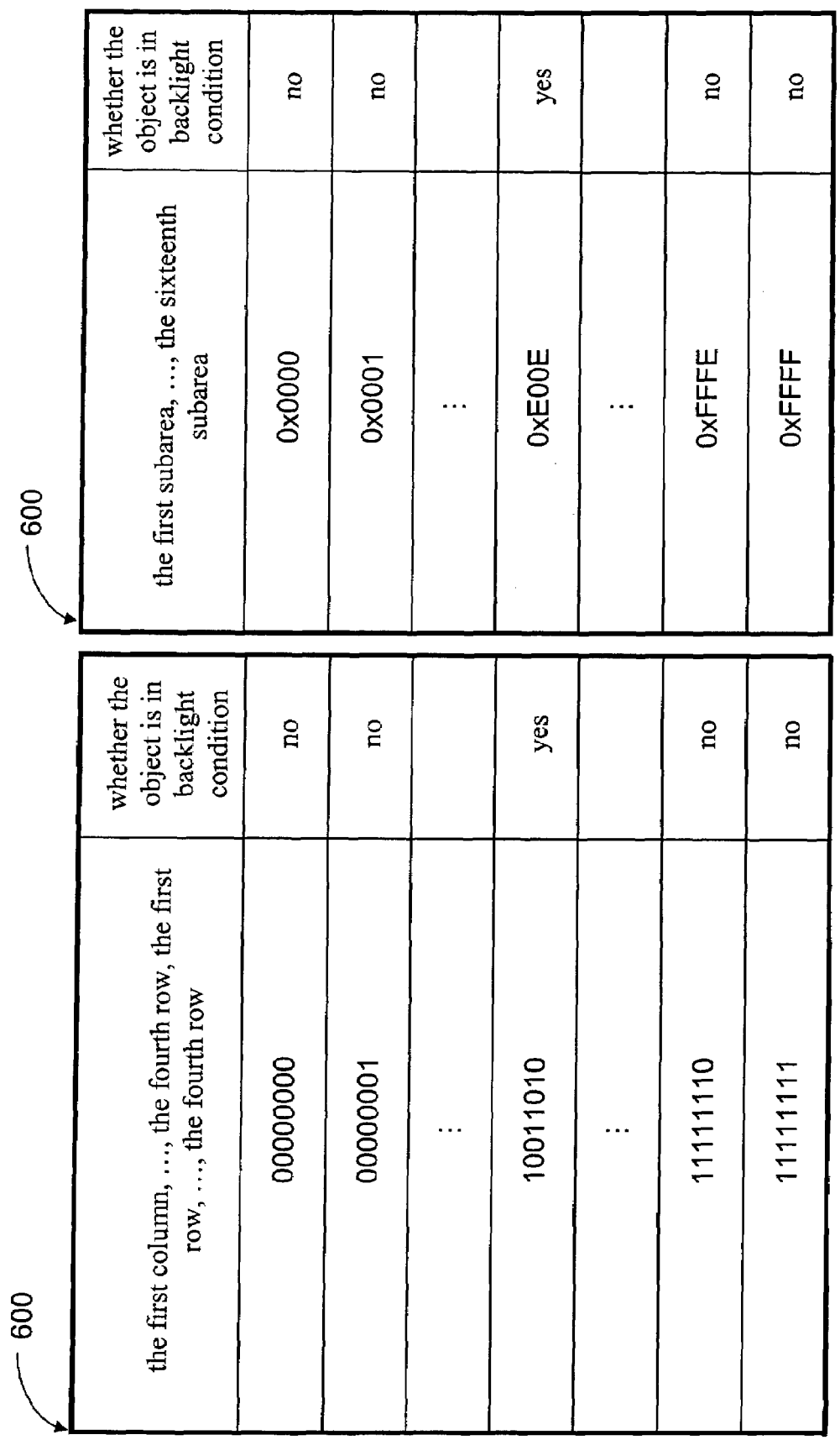
FIG. 5A is a backlight detection table according to an embodiment of the present invention.
FIG. 5B is another backlight detection table according to an embodiment of the present invention.

After the encoding module 140 generates codes (Step 240), the backlight determination module 160 in the present invention determines whether the shot person 401 is in backlight condition according to the codes generated by the encoding module 140 (Step 270). For example, in the backlight detection table 600 as shown in FIG. 5A, it can be known that the status value corresponding to the code 10011010 is "yes" by means of look-up table, which means that the shot person 401 is in backlight condition. Therefore, the backlight determination module 160 determines that the object 401 is in backlight condition, such that the camera 100 enters a backlight processing procedure (Step 280), for example, activating a flash lamp. In this manner, the present invention may solve the problem in the prior art that whether the object is in backlight condition cannot be determined accurately.

In fact, the encoding manner of the encoding module 140 of the present invention is not limited to the above. The methods of using the brightness values of each of the subareas in the focus area 300 as an encoding basis fall in the scope of the present invention. For example, whether the brightness values of each of the subareas are larger than the critical value is directly determined. If the brightness value of the first subarea 311 is larger than the critical value, the first subarea is encoded as 1. Otherwise, the first subarea is encoded as 0. In this manner, after the first to sixteenth subareas are all encoded, a code group 1110000000001110 (0xE00E if being represented by Hexadecimal) is obtained. The backlight determination module 160 searches a corresponding status value in the backlight detection table as shown in FIG. 5B, thereby determining whether the object 401 is in backlight condition.

The present invention further includes a status modification module 190, through which the user can modify the status values in the backlight detection table 600 when the backlight detection of the present invention deviates, such that the backlight detection of the present invention further conforms to the using conditions for the user.

Furthermore, since the object to be shot is far away from the camera, the flash lamp is useless. Therefore, the method provided by the present invention further includes determining whether an object distance generated by focusing is larger than a predetermined value (Step 220) after the focus area is set (Step 210). When the object distance is larger than the predetermined value, it indicates that the object to be shot is too far that the flash lamp of the object is useless. The present invention is completed without executing the backlight processing procedure (Step 280). When the object distance is smaller than or equal to the predetermined value, it is indicates that the flash lamp can compensate the backlight condition. Therefore, under this circumstance, the steps of determining it is the backlight condition is performed (Steps 240 to 280). In this manner, the present invention can further save the power of the camera.

In addition, in the present invention, after the focus area is set (Step 210), the method further includes determining whether the brightness value of the focus area 300 is lower than a predetermined value (Step 230), i.e., determining whether the focus area is too dim. When the focus area is too dim, the flash lamp is activated. Therefore, in the present invention, the backlight processing procedure will be executed directly (Step 280) without dividing the focus area into the subareas to determine whether the object is in backlight condition (Steps 240 to 270).

Furthermore, the method for backlight detection using the brightness values of the subareas in a focus area provided by the present invention can be applicable to hardware, software, or a combination thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for backlight detection using brightness values of subareas in a focus area, applicable to an image capture device, the method comprising the steps of:
    focusing an object and setting a focus area by the image capture device;
    dividing the focus area into a plurality of subareas;
    calculating a brightness value corresponding to each of the subareas respectively;
    generating a plurality of codes according to each of the brightness values and combining the plurality of codes into a code group; and
    reading a corresponding status value from a backlight detection table according to the code group, wherein when the status value indicates backlight, it is determined that the object is in a backlight condition.

2. The method for backlight detection using brightness values of subareas in a focus area as claimed in claim 1, wherein the step of dividing the focus area comprises the step of dividing the focus area into M×N subareas, wherein M is an integer larger than 1 and N is an integer larger than 1.

3. The method for backlight detection using brightness values of subareas in a focus area as claimed in claim 2, wherein the step of generating the plurality of codes according to each of the brightness values and combining the plurality of codes into the code group comprises the steps of:
    calculating a first sum of the brightness values corresponding to the N subareas in each of the M columns, respectively;
    setting the code of the column corresponding to the first sum of the brightness values as 1 (or 0) when the first sum of the brightness values is determined to be larger than a first critical value;
    setting the code of the column corresponding to the first sum of the brightness values as 0 (or 1) when the first sum of the brightness values is determined to be not larger than the first critical value;
    calculating a second sum of the brightness values corresponding to the M subareas in each of the N rows, respectively;
    setting the code of the row corresponding to the second sum of the brightness values as 1 (or 0) when the second sum of the brightness values is determined to be larger than a second critical value;
    setting the code of the row corresponding to the second sum of the brightness values as 0 (or 1) when the second sum of the brightness values is determined to be not larger than the second critical value; and
    arranging each of the columns and the rows in a specific sequence, such that the code group is composed of 0 and 1.

4. The method for backlight detection using brightness values of subareas in a focus area as claimed in claim 1, further comprising the step of determining whether an object distance generated when focusing the object is larger than a predetermined value, and ending the method when it is determined that an effect of light compensation for the object is not achieved.

5. The method for backlight detection using brightness values of subareas in a focus area as claimed in claim 1, further comprising the step of when the brightness value of the focus area is determined to be larger than a predetermined value, determining whether the object is in the backlight condition.

6. The method for backlight detection using brightness values of subareas in a focus area as claimed in claim 1, further comprising the step of modifying the backlight detection table, so as to adjust the status value of determining whether the object is in the backlight condition.

7. A system for backlight detection using brightness values of subareas in a focus area, applicable to an image capture device, the system comprising:
    a focus area set module, for setting a focus area;
    a focus area dividing module, for dividing the focus area into a plurality of subareas;
    a brightness calculation module, for calculating the brightness values corresponding to each of the subareas;
    an encoding module, for generating a plurality of codes according to each of the brightness values and combining the plurality of codes into a code group;
    a memory module, for storing a backlight detection table; and
    a backlight determination module, for reading a corresponding status value from the backlight detection table according to the code group, wherein when the status value indicates backlight, it is determined that an object is in a backlight condition.

8. The system for backlight detection using brightness values of subareas in a focus area as claimed in claim 7, wherein the focus area dividing module divides the focus area into M×N subareas, wherein M is an integer larger than 1 and N is an integer larger than 1.

9. The system for backlight detection using brightness values of subareas in a focus area as claimed in claim 8, wherein the encoding module calculates a first sum of the bright values corresponding to the N subareas in each of the M columns and a second sum of the brightness values of the M subareas in each of the N rows, respectively; when the first sum of the brightness values is larger than a first critical value, the code of the corresponding column is set as 1 (or 0), when the first sum of the brightness values is not larger than the first critical value, the code of the corresponding column is set as 0(or 1); when the second sum of the brightness values is larger than a second critical value, the code of the corresponding row is set as 1 (or 0), when the second sum of the brightness values is not larger than the second critical value, the code of the corresponding row is set as 0 (or 1); and after each of the columns and each of the rows are encoded, each of the columns and the rows are arranged in a specific sequence, such that the code group is composed of 0 and 1.

10. The system for backlight detection using brightness values of subareas in a focus area as claimed in claim 7, further comprising a status modification module for modifying the status value of the backlight detection table.

* * * * *